April 29, 1930.  D. E. PRIEST  1,756,605
MECHANISM FOR COLLECTING AND FEEDING SCREW EYES
Filed July 26, 1928  5 Sheets-Sheet 1

Inventor
Dwight E. Priest
By Attorneys

April 29, 1930. D. E. PRIEST 1,756,605
MECHANISM FOR COLLECTING AND FEEDING SCREW EYES
Filed July 26, 1928 5 Sheets-Sheet 2

Inventor
Dwight E. Priest
By Attorneys

April 29, 1930.  D. E. PRIEST  1,756,605
MECHANISM FOR COLLECTING AND FEEDING SCREW EYES
Filed July 26, 1928   5 Sheets-Sheet 3

Inventor
Dwight E. Priest
By Attorneys
Southgate Hays + Hawley

April 29, 1930.   D. E. PRIEST   1,756,605
MECHANISM FOR COLLECTING AND FEEDING SCREW EYES
Filed July 26, 1928   5 Sheets-Sheet 5

Inventor
Dwight E. Priest
By Attorneys

Patented Apr. 29, 1930

1,756,605

UNITED STATES PATENT OFFICE

DWIGHT E. PRIEST, OF WORCESTER, MASSACHUSETTS, ASSIGNOR TO PARKER WIRE GOODS COMPANY, OF WORCESTER, MASSACHUSETTS, A CORPORATION OF MASSACHUSETTS

MECHANISM FOR COLLECTING AND FEEDING SCREW EYES

Application filed July 26, 1928. Serial No. 295,557.

This invention relates to mechanism for collecting and feeding screw-eyes for threading operations or for other purposes. It has been heretofore customary to feed screw-eyes manually, which is a slow, expensive and sometimes dangerous practice.

It is the object of my invention to provide improved mechanism for picking up and placing screw-eyes in an orderly arrangement and for feeding the screw-eyes to a threading mechanism or other device.

My improved feeding mechanism also includes means for counting the screw-eyes and for presenting them in lots of uniform size for tying into sales packages or for other purposes.

Important features of my invention relate to the provision of a rotating hopper so designed as to present the screw-eyes to the feeding mechanism, and to the provision of a wire rod so mounted that the screw-eyes may slide the whole length of the rod while the rod is at all times firmly held in a definite position in the machine.

My invention further relates to arrangements and combinations of parts which will be hereinafter described and more particularly pointed out in the appended claims.

A preferred form of the invention is shown in the drawings in which

Fig. 1 is a front elevation of my improved feeding mechanism;

Fig. 1ª is a detail diagrammatic plan view, looking in the direction of the arrow 1ª in Fig. 1;

Figure 1:
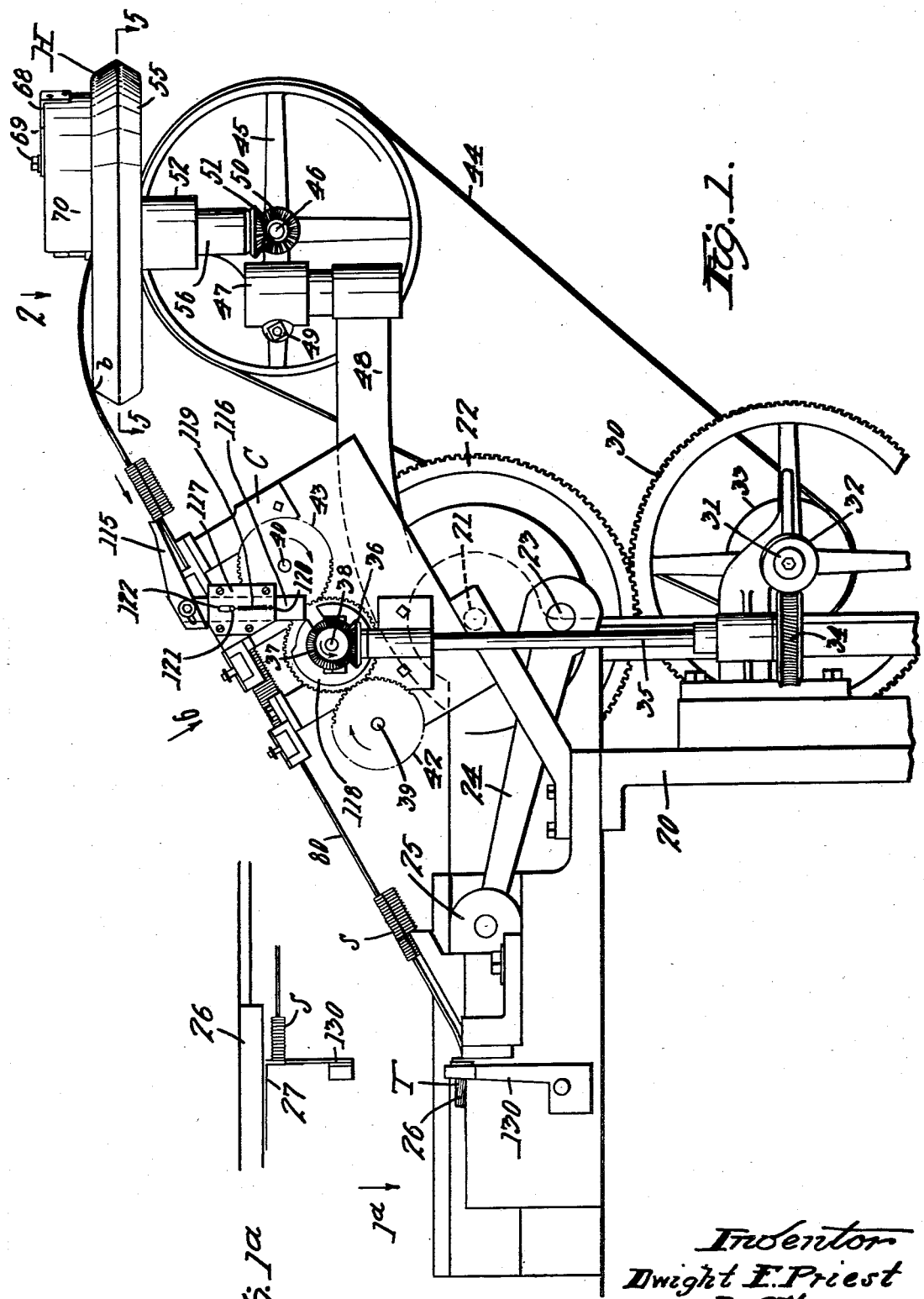

Referring to the drawings, my improved feeding mechanism comprises a frame 20 on which a hopper mechanism H, a numbering and a clamping mechanism C and a threading mechanism T are supported. A main shaft 21 is rotated from any suitable source of power (not shown) and a gear 22 is mounted thereon and is provided with a crank-pin 23. A connecting rod 24 connects the crank-pin 23 to a sliding block 25 which operates a movable thread die 26 (Fig. 1ª). This die slides alongside a fixed die 27 and rolls a thread in the usual manner. The details of the threading mechanism are not shown as they comprise no part of my present invention.

The gear 22 engages a similar gear 30 on a counter-shaft 31 mounted in fixed bearings and having a worm 32 and pulley 33 secured thereto. The worm 32 engages a worm gear 34 on an upright shaft 35 having a bevel gear 36 at its upper end, engaging a similar bevel gear 37 on a cam shaft 38.

Figure 12:
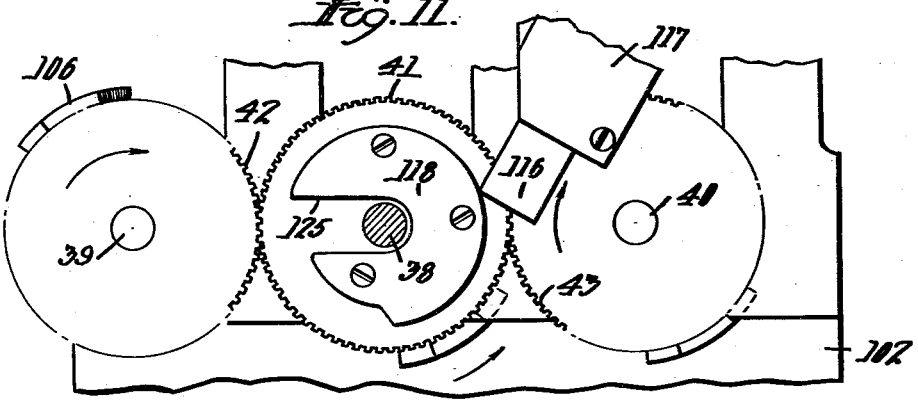
Fig. 12 is an enlarged detail front elevation of certain parts of the clamping mechanism.

The shaft 38 is connected to similar cam shafts 39 and 40 (Fig. 12) by spur gears 41, 42 and 43, the gears rotating in the directions of the arrows shown in Fig. 12. The operation of the cams will be hereinafter described.

The pulley 33 is connected by a belt 44 to a large pulley 45 on a counter-shaft 46 mounted in a bearing bracket 47 which is vertically adjustable on a frame member 48 and which may be secured in adjusted position by a clamping screw 49. The shaft 46 is connected by bevel gears 50 and 51 to the hub 52 of a hopper 55, the hopper being supported in a bearing 56 formed on the bracket 47 previously described.

Figures 3, 4:
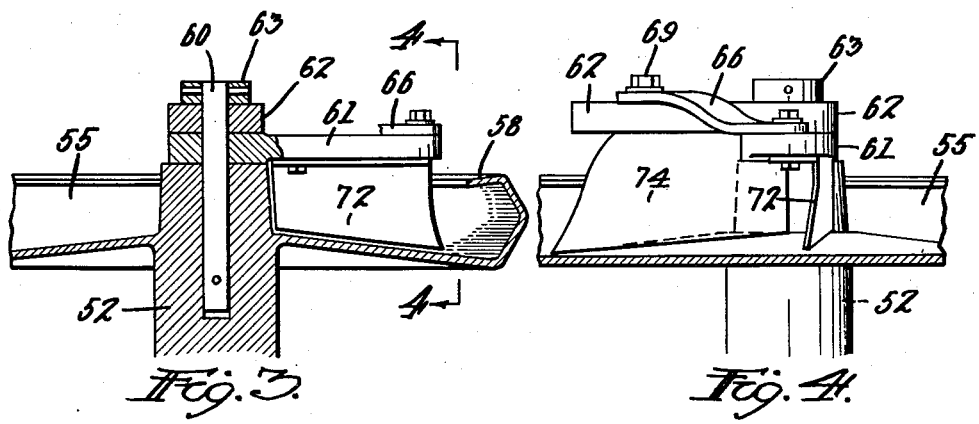
Fig. 3 is a partial sectional elevation of the hopper, taken along the line 3—3 in Fig. 2.
Fig. 4 is a partial sectional elevation of the hopper, taken along the line 4—4 in Figs. 2 and 3.

The cross section of the hopper 55 is best shown in Fig. 3, which indicates that the bottom of the hopper is downwardly inclined outward and that the outer wall of the hopper is V-shaped in section, with an inwardly overhanging ledge 58.

A stud 60 (Fig. 3) is secured in the upper end of the hub 52 and a pair of arms 61 and 62 are loosely mounted thereon and are held from displacement by a collar 63 pinned to the stud 60.

The arm 61 has a bolt and slot connection to a strap 64, connected to a fixed portion of the machine and by which the arm 61 may be held in any desired angular position. The arm 62 has a bolt and slot connection to a link 66 pivoted at 67 on the arm 61.

A block 68 is angularly adjustable on the arm 62 and may be secured by the same bolt 69 which connects the arm 62 with the link 66. The block 68 supports a guard member 70 rising substantially above the hopper, as indicated in Fig. 1, and preventing the escape of screw-eyes therefrom.

A guide-plate or scraper 72 is secured to the side of the arm 61, and a second guide-plate or scraper 74 is mounted beneath the arm 62, the latter guide-plate being inclined and acting somewhat in the nature of a plow to force the screw-eyes outwardly toward the periphery of the hopper for a purpose to be described. The bolt and slot connections permit a wide range of adjustment for the scrapers 72 and 74.

Figure 2:
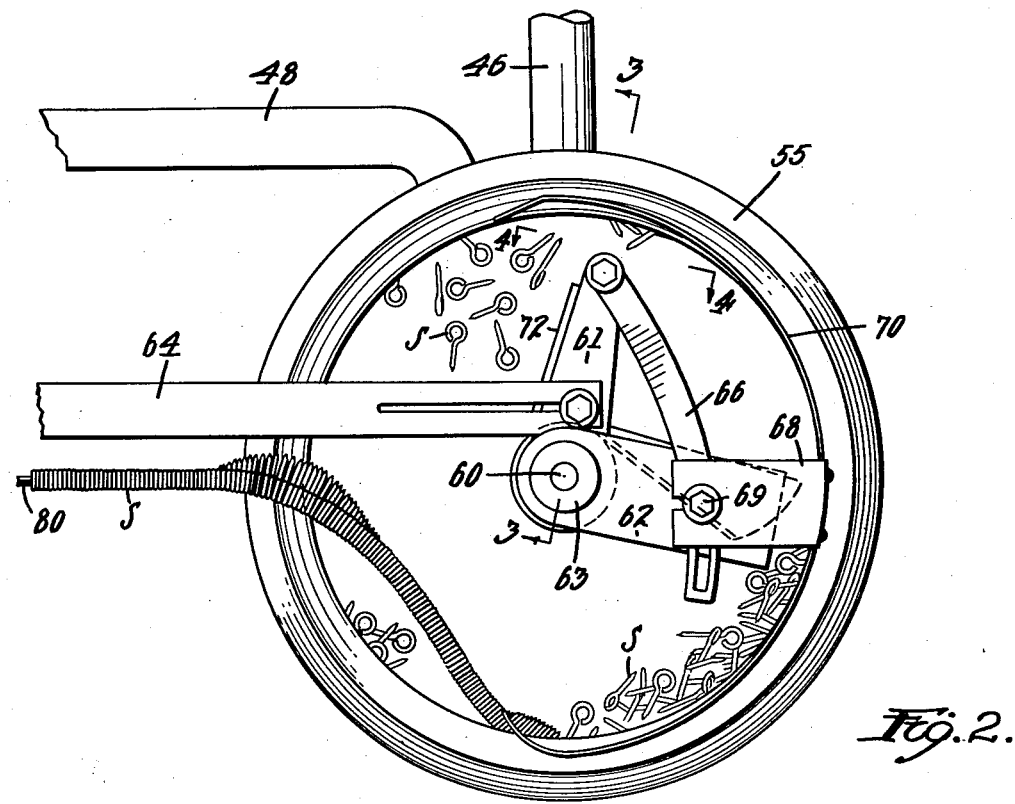
Fig. 2 is a plan view of the hopper, looking in the direction of the arrow 2 in Fig. 1.
Figure 5:
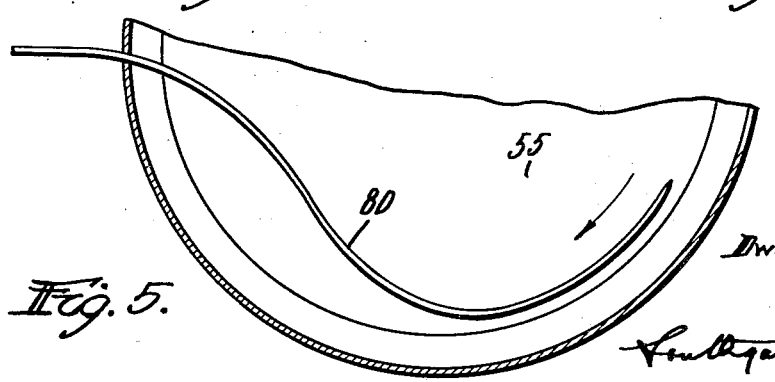
Fig. 5 is a partial sectional plan view of the hopper, taken along the line 5—5 in Fig. 1.

An assembling rod or wire 80 is supported in the machine and projects over the edge of the hopper and then downward toward the bottom of the hopper at the periphery thereof, as indicated in Figs. 1 and 5. The end of the rod 80 projects into the path of the rotating screw-eyes as they are crowded to the outer part of the hopper in passing the guide-plate 74, and the rod 80 picks up such of the screw-eyes as are presented in alignment therewith, which screw-eyes are forced along by the picking up of succeeding screw-eyes until they finally pass over the edge of the hopper as indicated in Fig. 2 and slide down the inclined portion of the assembling rod 80.

It will be noted that the upper end of the rod 80 is entirely unsupported, except as it rests lightly on the edge of the hopper at the point $b$ (Fig. 1).

Figure 6:
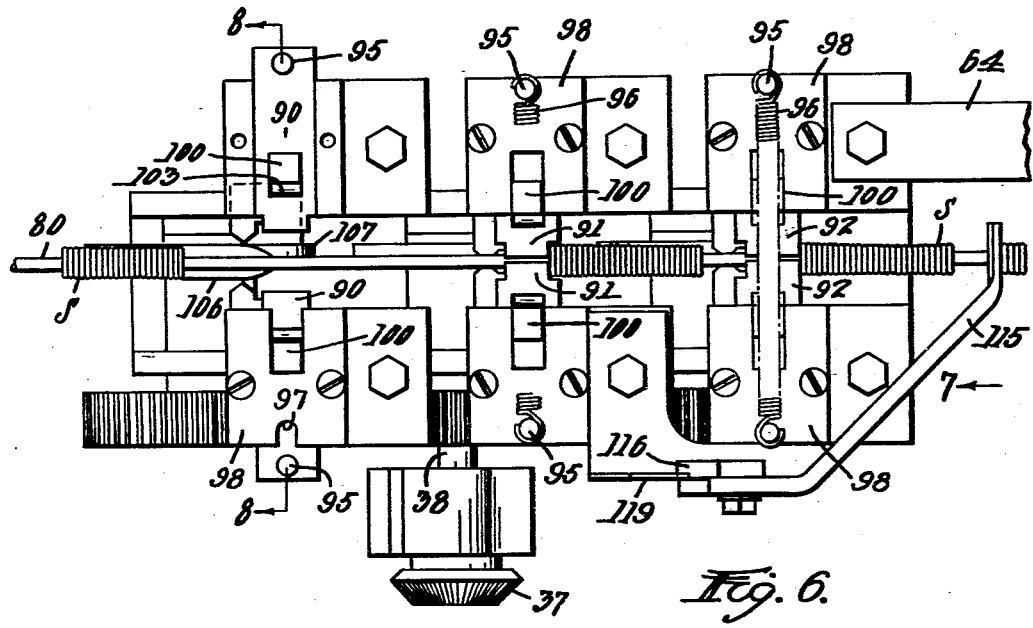
Fig. 6 is an enlarged plan view of the clamping mechanism, looking in the direction of the arrow 6 in Fig. 1.
Figures 7, 8:
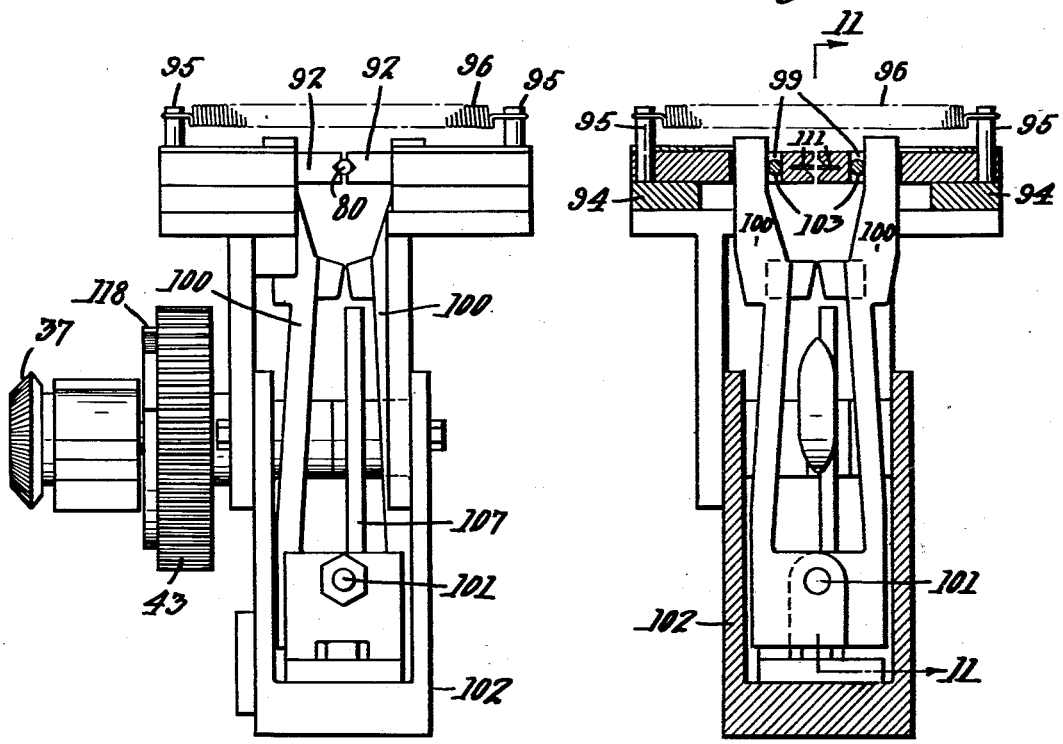
Fig. 7 is an end view of the clamping mechanism, looking in the direction of the arrow 7 in Fig. 6.
Fig. 8 is a sectional end elevation of the clamping mechanism, taken along the line 8—8 in Fig. 6.

It is desired to have the screw-eyes slide downward along the wire rod 80 to delivery position, but it is also necessary to hold the rod 80 in fixed position for picking up the screw-eyes in the hopper. Accordingly I provide the special rod clamping mechanism shown in Figs. 6 to 8.

This clamping mechanism comprises three pairs of clamping jaws 90, 91 and 92 which are substantially identical in construction. A description of the jaws 90 and their method of operation will apply equally to the jaws 91 and 92.

The jaws 90 are mounted to slide transversely on a supporting surface 94 (Fig. 8) and are provided with studs 95 connected by a spring 96 which normally draws the jaws 90 toward each other until the studs 95 engage the inner ends of notches 97 (Fig. 6) in the cover plates 98.

Figure 11:
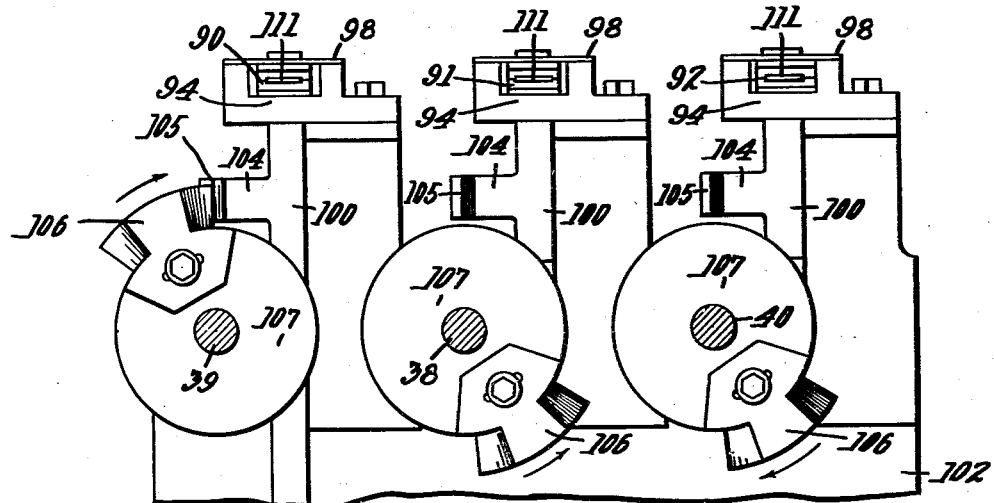
Fig. 11 is a sectional front elevation of the clamping mechanism, taken along the line 11—11 in Fig. 8.

The jaws 90 are provided with slots 99 through which project the upper ends of cam levers 100, pivoted at 101 in the lower porton of a frame member 102 which supports the clamping mechanism. Bearing studs 103 extend through the slots 99 and are engaged by the inner faces of the cam levers 100. The cam levers are provided with offset projections 104 (Fig. 11) having surfaces 105 positioned for engagement by wedge-shaped cam members 106 detachably secured on discs 107 mounted to rotate with the cam shafts 38, 39 and 40 previously described.

As one of the cam members 106 passes between the levers 100, the clamping jaws 90 will be moved outward to release the rod 80, permitting the screw-eyes to slide down along the rod. As soon as the cam member 106 is disengaged from the cam levers 100, the spring 96 will again close the jaws on the rod 80.

Figure 9:
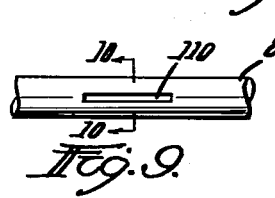
Fig. 9 is a side view of a portion of the rod on which the screw-eyes are supported.
Figure 10:
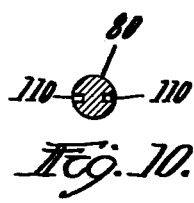
Fig. 10 is a cross section thereof, taken along the line 10—10 in Fig. 9.

The rod 80 is preferably provided with slots 110 (Figs. 9 and 10) on the opposite sides thereof, positioned for engagement by flat plates 111 mounted in recesses in the adjacent ends of the jaws 90. When these flat plates are seated in the notches 110, lengthwise movement of the rod 80 is effectually prevented.

Figure 13:
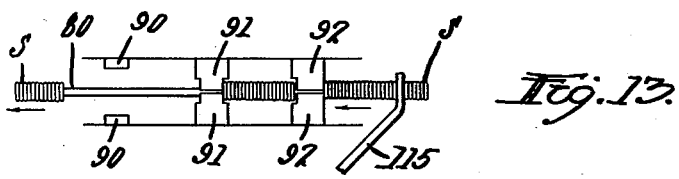
Figs. 13, 14 and 15 are diagrammatic plan views, illustrating the operation of the counting and clamping mechanism.
Figure 14:
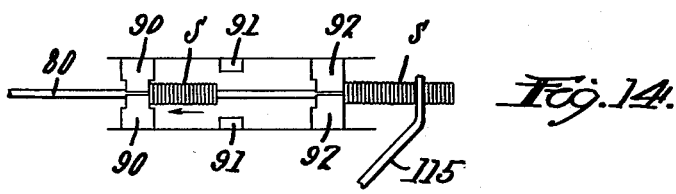
Figure 15:
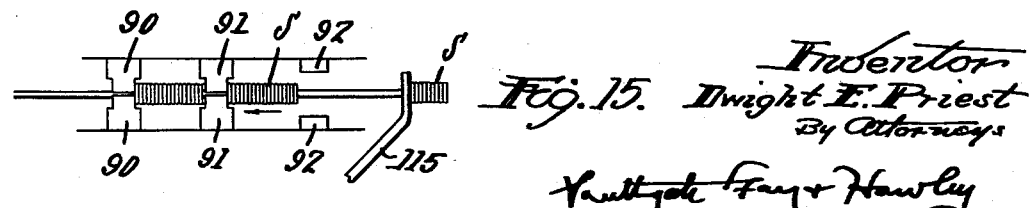
Figure 16:
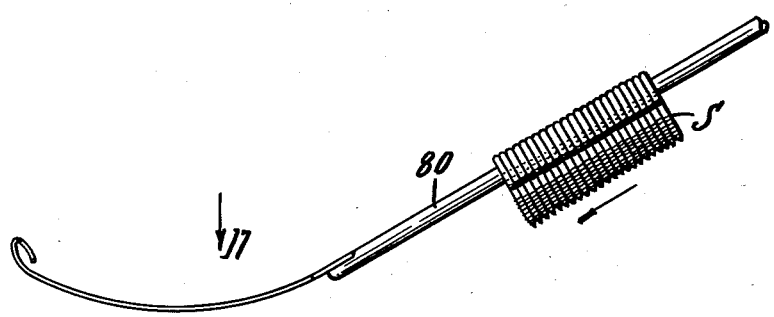
Fig. 16 is a side elevation of the lower end of the supporting wire, adapted for assembling sales packages.
Figure 17:
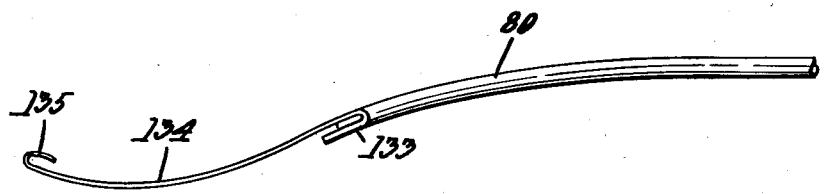
Fig. 17 is a plan view of the same parts, looking in the direction of the arrow 17 in Fig. 16.

The clamping jaws and their actuating cams are so timed that they operate successively, as indicated in Figs. 13, 14 and 15. The jaws 90 are first opened to permit a bunch of screw-eyes S to slide downward along the rod 80. At the same time the jaws 91 and 92 both firmly engage the rod 80 and prevent endwise movement thereof.

The jaws 90 are then closed and the jaws 91 opened, leaving the rod firmly held by the jaws 90 and 92. After the jaws 91 are closed, the jaws 92 are opened, the rod being then held by the jaws 90 and 91. The screw-eyes S are thus passed successively by the different pairs of clamping jaws and there are always two pairs of jaws in firm engagement with the rod 80.

By this successive operation of the clamping jaws, I am able to permit the screw-eyes to slide freely the whole length of the rod 80, while at the same time firmly supporting the rod and preventing longitudinal movement thereof.

A latch or holding device 115 (Figs. 1 and 6) is adjustably clamped to the upper end of a slide 116, mounted in a guideway 117 and engaging a cam plate 118 (Fig. 12) at its lower end. A spring 119 (Fig. 1) is connected at its lower end to a fixed stud 120 and at its upper end to a stud 121, secured in the slide 116 and extending outward through a slot 122 in the guide 117. The spring acts to keep the slide or plunger 116 firmly seated against the cam 118, and the stud 121 acts to limit downward movement thereof.

The cam plate 118 is secured to the side of the gear 41 on the cam shaft 38 and may be formed with a U-shaped notch 125, permitting convenient removal and replacement of the cam plate, which may be changed to vary the period during which the latch 115 is raised.

When the latch is in lowered position, it prevents downward movement of the screw-eyes S as indicated in Fig. 1. When the latch is raised, the screw-eyes will move downward into engagement with the upper jaws 92. By setting the latch 115 a selected distance from the jaws 92, the number of screw-eyes permitted to slide down at each opening of the jaws 92 may be regulated, the latch 115 thus operating as a counting device.

Any suitable counting mechanism (not shown) may be provided for keeping track of the number of reciprocations of the slide 116, and each reciprocation will correspond to a selected number of screw-eyes according to the adjustment of the latch.

When the feeding mechanism is used in connection with a threading machine, the latch 115 is useful in preventing downward movement of screw-eyes in such numbers that the jaws 92 could not thereafter be closed. When threading screw-eyes, a transversely movable feeding member 130 delivers the eyes singly to the threading dies.

My improved feeding mechanism is also very useful in assembling and arranging finished screw-eyes or similar products for shipment or sale. It is frequently desired to put up such articles in packages containing uniform small numbers of articles, such as twelve, twenty or twenty-five in a bunch or package. For this purpose the lower end of the rod 80 is provided with a lug or projection 132, depressed into alignment with the normal surface of the rod, and adapted to receive the looped end 133 of a light tire wire 134. A second loop 135 is formed at the opposite end of the wire 134.

Figure 19:
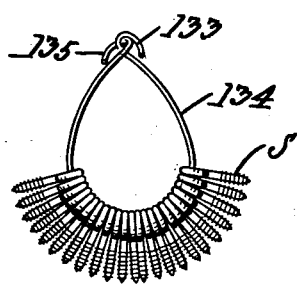
Fig. 19 is a side view of a number of screw-eyes made up into a sales package.
Figure 18:
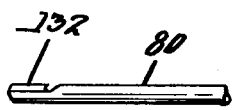
Fig. 18 is a side elevation of the lower end of the supporting wire.

One of these wires is placed on the end of the rod 80 and a selected number of screw-eyes S is allowed to slide downward on to the wire, the ends of which are thereafter hooked together as indicated in Fig. 19. By this method of operation the screw-eyes are delivered in packages, each containing exactly the desired number. It will be understood that a new wire 134 must be attached to the rod 80 as often as the jaws 90 open to allow a bunch of screw-eyes to slide downward to the tie wire 134.

I have thus produced a simple and effective machine by which screw-eyes may be arranged in uniform position and may be presented at a delivery point for further operations or may be presented in numbered groups for delivery in sales packages.

While I have described the screw-eyes as being moved by gravity after passing the edge of the hopper, it will be evident that they would be fed along the rod 80 without the aid of gravity by the pressure of the additional screw-eyes being forced up from the hopper and consequently my device remains operative even if the rod 80 is not downwardly inclined.

Having thus described my invention and the advantages thereof, I do not wish to be limited to the details herein disclosed, otherwise than as set forth in the claims, but what I claim is:—

1. A machine for assembling and feeding screw-eyes comprising a rotatable hopper, an assembling rod projecting into said hopper and along which said screw-eyes are slidable from end to end thereof, and releasable means spaced from the ends of the rod to retain said rod in predetermined operative position.

2. A machine for assembling and feeding screw-eyes comprising a rotatable hopper, an assembling rod projecting into said hopper and along which said screw-eyes are slidable from end to end thereof, and mechanical releasable rod clamping means spaced from the ends of the rod effective to hold said rod in predetermined operative position.

3. A machine for assembling and feeding screw-eyes comprising a rotatable hopper, an assembling rod projecting into said hopper and along which said screw-eyes are slidable from end to end thereof, and a plurality of releasable rod clamping devices spaced from the ends of the rod effective to hold said rod in predetermined operative position, means to separately move said clamping devices to and from clamping position.

4. A machine for assembling and feeding screw-eyes comprising a rotatable hopper, an assembling rod having an end portion projecting into said hopper, in the path of the screw eyes and along which said screw-eyes are slidable from end to end thereof, a clamping mechanism comprising three pairs of rod clamping jaws, and means to open and close said pairs of jaws successively.

5. A machine for assembling and feeding screw-eyes comprising a rotatable hopper, an assembling rod having an end portion projecting into said hopper, in the path of the screw eyes and along which said screw-eyes are slidable from end to end thereof, a clamping mechanism comprising three pairs of rod clamping jaws, and means to open and close said pairs of jaws successively, two pairs of said jaws being always in closed position while the third pair is open.

6. A machine for assembling and feeding screw-eyes comprising a rotatable hopper, an assembling rod projecting into said hopper and along which said screw-eyes are slidable, and a plurality of rod clamping devices effective to hold said rod in predetermined operative position, said clamping devices having projections thereon and said rod having recesses to receive said projections, whereby said rod is held from axial movement.

7. A machine for assembling and feeding screw-eyes comprising a rotatable hopper, an assembling rod, and means to support said rod in an inclined position adjacent said hopper, said screw-eyes being fed along said rod to delivery position by gravity, the upper portion of said rod projecting into the path of the screw-eyes rotating with the hopper, and the end thereof being spaced from the adjacent surfaces of said hopper, and releasable means spaced from the ends of the rod to retain said rod in its position relative to the hopper.

8. A machine for assembling and feeding screw-eyes comprising a rotatable hopper, an assembling rod positioned adjacent said hopper, two devices positioned to successively engage said rod and block downward sliding movement of said screw-eyes on said rod, and means to render said devices alternately operative, said devices being definitely spaced apart to permit a predetermined number of screw-eyes to be delivered at each complete actuation thereof.

9. A machine for assembling and feeding screw-eyes comprising a rotatable hopper, an assembling rod positioned adjacent said hopper, two devices positioned to successively engage said rod and block downward sliding movement of said screw-eyes on said rod, means to render said devices alternately operative, said devices being definitely spaced apart to permit a predetermined number of screw-eyes to be delivered at each complete actuation thereof, and means to so separate one of said devices as to determine the number of screw-eyes to be thus delivered in each lot.

10. A machine for assembling and feeding screw-eyes comprising a rotatable hopper, an assembling rod, means to support said rod adjacent said hopper, means to deliver screw-eyes in lots of uniform size at the lower end of said rod, and means to detachably secure a tie wire to said rod to receive each successive lot of screw-eyes.

11. A machine for assembling and feeding screw-eyes comprising a rotatable hopper, an assembling rod projecting into said hopper and along which said screw-eyes are slidable from end to end thereof, a plurality of releasable rod clamping devices spaced from the ends of the rod effective to hold said rod in predetermined operative position, and cam means effective to open and close said clamping devices in predetermined relation.

12. In a machine for assembling and feeding screw-eyes, a supporting rod on which screw-eyes are slidable, releasable means spaced from the ends of the rod to support said rod, said supporting means, when released, permitting said screw-eyes to slide along said rod from one end thereof to the other, and feeding means automatically to remove said screw-eyes successively from the discharge end of said rod.

13. In a machine for assembling and feeding screw-eyes, a supporting rod mounted in an inclined position and along which screw-eyes are slidable by gravity, releasable means spaced from the ends of the rod to support said rod to permit movement of said screw-eyes from end to end thereof, and feeding means automatically to remove said screw-eyes successively from the lower end thereof.

14. A machine for assembling and feeding screw-eyes comprising a rotatable hopper, an assembling rod projecting into said hopper and having a portion over-lying the bottom thereof and on which rod said screw-eyes assemble themselves and slide from end to end thereof, and means to retain said rod in predetermined operative position.

15. A machine for assembling and feeding screw-eyes comprising a rotatable hopper, an assembling rod extending into said hopper and having a portion over-lying the bottom thereof, and means to support said rod in an inclined position adjacent said hopper, said screw-eyes assembling themselves on said rod and being fed along said rod to delivery position by gravity.

16. A machine for assembling and feeding screw-eyes comprising a rotatable hopper, an assembling rod, and means to support said rod in an inclined position adjacent said hopper, said screw-eyes being fed along said rod to delivery position by gravity, and the upper portion of said rod projecting within said hopper and partially over-lying the bottom thereof and near the periphery thereof and into the path of the screw-eyes rotating with the hopper.

17. A machine for assembling and feeding screw-eyes comprising a rotatable hopper, an assembling rod, and means to support said rod in an inclined position adjacent said hopper, said screw-eyes being fed along said rod to delivery position by gravity, the upper portion of said rod projecting over the rim of said hopper and downward within said hopper partially over-lying the bottom thereof adjacent the lower peripheral corner of said hopper and extending into the path of the screw-eyes rotating with the hopper, and said rod being in part positioned by resting lightly on the upper edge of said hopper.

18. A machine for assembling and feeding screw-eyes comprising a rotatable hopper, an assembling rod, and means to support said rod in an inclined position adjacent said hopper, said screw-eyes being fed along said rod to delivery position by gravity, the upper portion of said rod projecting over the rim of said hopper and downward within said hopper and partially over-lying the bottom thereof adjacent the lower peripheral corner of said hopper and extending into the path of the screw-eyes rotating with the hopper, and the end thereof being spaced from the adjacent surfaces of said hopper.

In testimony whereof I have hereunto affixed my signature.

DWIGHT E. PRIEST.